United States Patent
Khanlarov et al.

(10) Patent No.: US 12,319,111 B2
(45) Date of Patent: Jun. 3, 2025

(54) HYDRAULIC SYSTEM OF AN ACTIVE CHASSIS OF A MOTOR VEHICLE

(71) Applicant: Dr. Ing. h.c. F. Porsche Aktiengesellschaft, Stuttgart (DE)

(72) Inventors: Jafar Khanlarov, Baden-Baden (DE); Albert Miller, Dresden (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 18/630,204

(22) Filed: Apr. 9, 2024

(65) Prior Publication Data
US 2024/0416712 A1 Dec. 19, 2024

(30) Foreign Application Priority Data
Jun. 13, 2023 (DE) .......................... 102023115403.6

(51) Int. Cl.
*B60G 21/10* (2006.01)
*B60G 17/015* (2006.01)
*B60G 17/04* (2006.01)

(52) U.S. Cl.
CPC ....... *B60G 21/106* (2013.01); *B60G 17/0152* (2013.01); *B60G 17/0408* (2013.01);
(Continued)

(58) Field of Classification Search
CPC .............. B60G 21/106; B60G 17/0152; B60G 17/0408; B60G 2202/413; B60G 2202/416; B60G 2204/82; B60G 2500/322
See application file for complete search history.

(56) References Cited

U.S. PATENT DOCUMENTS 3,871,635 A * 3/1975 Unruh .................. B60G 21/073
267/64.16
3,917,295 A * 11/1975 Hiruma .................. B60G 21/06
280/6.15
(Continued)

FOREIGN PATENT DOCUMENTS

EP 2196337 A1 6/2010
JP H06159428 A * 6/1994 ............. B60G 13/08
WO 2021260586 A1 12/2021

OTHER PUBLICATIONS

German Examination Report for German Application No. 10 2023 115 403.6, mailed Jun. 5, 2024 with English language translation. (8 pages).

*Primary Examiner* — Frank B Vanaman
(74) *Attorney, Agent, or Firm* — Buchanan Ingersoll & Rooney PC

(57) ABSTRACT

A hydraulic system for an active chassis of a motor vehicle. The hydraulic system includes a plurality of hydraulic actuators, a plurality of hydraulic lines, a hydraulic accumulator, and an electro-hydraulic motor pumping unit, by way of which, during operation of the hydraulic system, a hydraulic fluid, in particular a hydraulic oil, is conveyable through the hydraulic lines. The hydraulic system also includes valves that are associated with the hydraulic actuators. The hydraulic system is designed to electronically control a selective filling of the hydraulic actuators with the hydraulic fluid. The hydraulic system includes a cooling apparatus having a cooling body, which is attached to the hydraulic accumulator.

11 Claims, 2 Drawing Sheets

(52) U.S. Cl.
CPC .. *B60G 2202/413* (2013.01); *B60G 2202/416* (2013.01); *B60G 2204/82* (2013.01); *B60G 2500/322* (2013.01); *B60G 2800/012* (2013.01)

(56) References Cited

U.S. PATENT DOCUMENTS

| | | | | |
|---|---|---|---|---|
| 4,324,417 | A | * | 4/1982 | Johansson ............ B62D 61/125 |
| | | | | 280/681 |
| 4,700,972 | A | * | 10/1987 | Young ................ B60G 17/0195 |
| | | | | 280/5.521 |
| 4,753,332 | A | * | 6/1988 | Bieber .................... F16D 25/14 |
| | | | | 192/113.36 |
| 4,815,751 | A | * | 3/1989 | Tuczek ................ B60G 21/106 |
| | | | | 280/DIG. 1 |
| 5,384,706 | A | * | 1/1995 | Uchiyama .......... B60G 17/0152 |
| | | | | 280/5.514 |
| 6,308,973 | B1 | * | 10/2001 | Griebel ............. B60G 17/0152 |
| | | | | 280/124.159 |
| 2009/0229902 | A1 | * | 9/2009 | Stansbury, III ........ B60K 25/10 |
| | | | | 180/165 |
| 2016/0200164 | A1 | * | 7/2016 | Tabata ................. B60G 21/073 |
| | | | | 280/5.508 |
| 2018/0022179 | A1 | * | 1/2018 | Collins .............. B60G 17/0424 |
| | | | | 280/5.5 |
| 2020/0347905 | A1 | | 11/2020 | Marking |

\* cited by examiner

HYDRAULIC SYSTEM OF AN ACTIVE CHASSIS OF A MOTOR VEHICLE

CROSS-REFERENCE TO RELATED APPLICATION

This application claims priority to German Patent Application No. 10 2023 115 403.6, filed Jun. 13, 2023, the content of such application being incorporated by reference herein in its entirety.

FIELD OF THE INVENTION

The present invention relates to a hydraulic system of an active chassis of a motor vehicle having a number of hydraulic actuators, the hydraulic system comprising a plurality of hydraulic lines, a hydraulic accumulator, and an electro-hydraulic motor pumping unit, by means of which, during operation of the hydraulic system, a hydraulic fluid, in particular a hydraulic oil, is conveyable through the hydraulic lines, as well as comprising valve means associated with the hydraulic actuators, the hydraulic system being designed to electronically control a selective filling of the hydraulic actuators with the hydraulic fluid. The present invention further relates to a motor vehicle having a vehicle body and an active chassis comprising a number of hydraulic actuators and a hydraulic system for operating the hydraulic actuators.

BACKGROUND OF THE INVENTION

Various embodiments of motor vehicles comprising an active chassis are known from the prior art. By means of an active chassis, it is possible to actively engage the suspension and dampening of the motor vehicle in order to thereby in particular reduce rolling, lifting and pitching movements of the vehicle structure.

An active chassis of a motor vehicle can comprise, e.g., an active roll stabilization device that serves to reduce corresponding roll movements of a vehicle structure of the motor vehicle, i.e., rotational movements about a longitudinal axis of a vehicle-fixed coordinate system, especially during travel along a curve.

One embodiment of an active roll stabilization device known from the prior art the art comprises a hydraulic actuator having an actively adjustable hydraulic cylinder on each of the wheel suspensions of the motor vehicle. These hydraulic actuators replace the rigid coupling rods conventionally used to connect the stabilizers. The lower part of the hydraulic cylinders is connected to the respective wheel carrier at the outer mounting points of the stabilizers and the upper part. By electronically controlling the filling of the hydraulic cylinders with a hydraulic fluid, in particular with a hydraulic oil, the stroke of the hydraulic cylinders changes and the respective stabilizer is more or less biased. The hydraulic cylinders of the hydraulic actuators are controlled individually depending on the driving situation, which in particular affects the self-steering behavior and as a result vehicle stabilization is improved.

An active chassis can, e.g., also comprise a hydraulic level control device in order to vary in particular the ground clearance of the motor vehicle or to keep the vehicle level constant under different loading conditions.

As an alternative to a hydraulic level control device acting on the wheel suspensions of the front wheels and rear wheels of the vehicle, an active chassis can also comprise a hydraulic front axle lift device having two hydraulic actuators each comprising a hydraulic lift cylinder. Using the front axle lift device, it is possible to selectively raise the front end of the vehicle of the motor vehicle, and thus increase the slope angle of the motor vehicle. This raising of the front end of the vehicle is particularly advantageous in the case of steep underground parking access roads or when driving speed thresholds on the roadway in order to prevent undesirable placement of the motor vehicle with the front end of the vehicle.

The hydraulic system has the problem that at least some components are subjected to relatively high thermal stresses. In particular, the electro-hydraulic motor pump unit as well as a valve block of the rear axle, which comprises a number of valve means, are typically the highest thermally loaded. A further problem is that there is often not sufficient installation space available within the motor vehicle to actively cool the thermally stressed components of the hydraulic system using a conventional cooling system.

A hydraulic accumulator is known from EP 2 196 337 A1, which is incorporated by reference herein, which is arranged downstream of a damping valve of a vehicle damping device. The hydraulic accumulator comprises a storage space and a pressure space arranged adjacent said one that is filled with a compressed gas. A cooling element is arranged in the pressure space.

SUMMARY OF THE INVENTION

Described herein is a hydraulic system for an active chassis of a motor vehicle of the type specified hereinabove, as well as a motor vehicle of said type comprising an active chassis such that improved cooling of thermally loaded components of the hydraulic system can be achieved.

A hydraulic system according to the present invention is characterized in that the hydraulic system comprises a cooling apparatus having a cooling body, which is attached to the hydraulic accumulator. By means of this measure according to aspects of the invention, it is advantageously possible to cool the hydraulic fluid within the hydraulic accumulator so that improved cooling of thermally loaded components of the hydraulic system can also be achieved as a result.

In one preferred embodiment, it is proposed that the outside of the cooling body comprises a plurality of cooling fins. These cooling fins advantageously cause an increase in the cooling surface of the cooling body to thereby further improve heat dissipation.

In a particularly preferred embodiment, there is the option of the cooling body being directly connected to a vehicle body of the motor vehicle, in particular bolted. As a result, a further significant increase of the available cooling surface of the cooling body is provided, so that even more efficient heat dissipation can be achieved in a simple manner.

In one advantageous embodiment, it can be provided that the hydraulic accumulator comprises a connection portion, to which a cooler extension of the cooling apparatus is attached. Further improved cooling of the hydraulic fluid, and thus also the thermally loaded components of the hydraulic system, is provided as a result.

In a particularly advantageous embodiment, it is proposed that the cooler extension is designed such that hydraulic fluid flows through and/or around it during operation of the hydraulic system. As a result, the cooling of the hydraulic fluid can be further improved.

In order to enable the cooling of the hydraulic fluid to occur not only by diffusion, in an advantageous further development the option exists that the cooling apparatus comprises further means for cooling the hydraulic fluid. Faster cooling of the hydraulic fluid is achieved thereby.

In one embodiment, it is proposed that the hydraulic system and at least some of the hydraulic actuators are parts of an active roll stabilizing device of the motor vehicle.

In one embodiment, the option exists for the hydraulic system and at least some of the hydraulic actuators to be parts of a front axle lift device of the motor vehicle. By means of the front axle lift device, it is possible to raise the front end of the vehicle as needed, thus increasing the slope angle of the motor vehicle. This raising of the front end of the vehicle is particularly advantageous for steep underground parking access roads or when driving speed thresholds on the roadway in order to prevent an undesirable placement of the motor vehicle with the front end of the vehicle there.

In another embodiment, the option exists for the hydraulic system and at least some of the hydraulic actuators to be parts of a level control device of the motor vehicle.

If the motor vehicle is equipped with a hydraulically operating roll stabilizing device and additionally with a hydraulic level control device or a hydraulic front axle lift device, it is also ultimately advantageous for packaging reasons to use a common hydraulic system for its operation.

BRIEF DESCRIPTION OF THE DRAWINGS

Further features and advantages of the present invention become apparent from the following description of a preferred exemplary embodiment with reference to the appended drawings. Shown are.

DETAILED DESCRIPTION OF THE INVENTION

Figure 1:
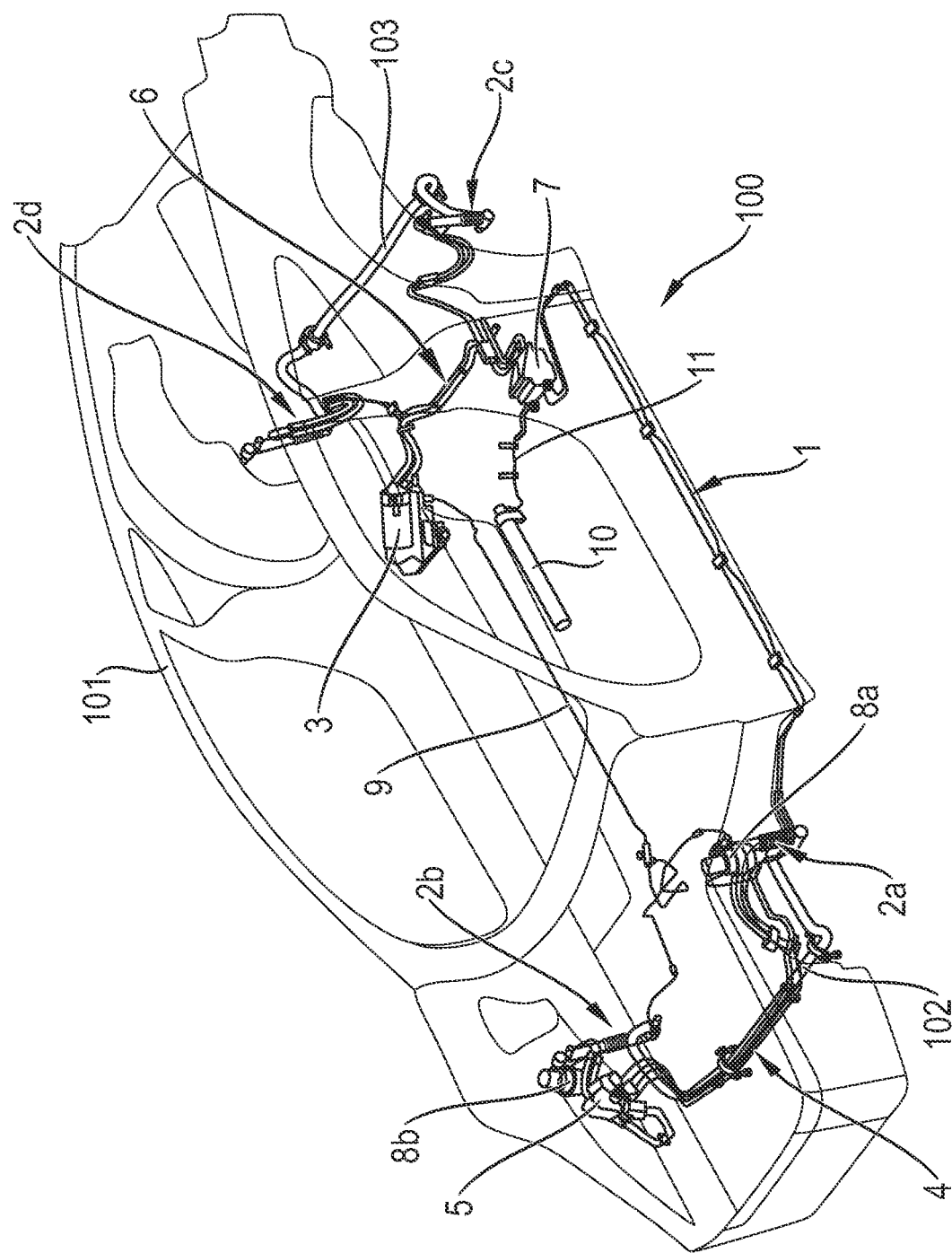
FIG. 1 is a perspective view showing the main components of an active chassis of a motor vehicle equipped with an active roll stabilizing device and with a front axle lift device.

Referring to FIG. 1, there is shown a motor vehicle 100 having an active chassis, which in the present case is equipped with a hydraulic roll stabilization device and with a hydraulic front axle lift device. The motor vehicle comprises a hydraulic system 1, by means of which the hydraulic roll stabilization device and the hydraulic front axle lift device can be operated. The active chassis of the motor vehicle is known to comprise a first (front) stabilizer 102 and a second (rear) stabilizer 103. Such stabilizers 102, 103 are designed to reduce the angle of roll that occurs during travel along a curve.

The hydraulic roll stabilization device is provided to reduce corresponding roll movements of a vehicle structure of the motor vehicle 100—i.e., rotational movements about a longitudinal axis of a vehicle-fixed coordinate system, especially during travel along a curve. The hydraulic roll stabilization device comprises a hydraulic actuator 2a, 2b, 2c, 2d with an actively adjustable hydraulic cylinder on each of the four wheel suspensions of the motor vehicle 100. These hydraulic actuators 2a, 2b, 2c, 2d form a first group of actuators and replace the rigid coupling rods commonly used to tie the stabilizers 102, 103. In this case, the lower part of the hydraulic cylinders of the hydraulic actuators 2a, 2b, 2c, 2d is connected to the respective wheel carrier at the outer mounting points of the stabilizers 102, 103 and the upper part. By electronically filling the hydraulic cylinders with a hydraulic fluid, in particular a hydraulic oil, the stroke of the hydraulic cylinders changes and the respective stabilizer 102, 103 is more or less biased. The hydraulic cylinders of hydraulic actuators 2a, 2b, 2c, 2d are controlled individually depending on the travel situation, thereby affecting the self-steering behavior and consequently improving vehicle stabilization.

For the operation of the hydraulic roll stabilization device, the motor vehicle 100 comprises the hydraulic system 1, which comprises a plurality of hydraulic lines (not provided with reference characters) and an electro-hydraulic motor pumping unit 3, by means of which a hydraulic fluid, in particular a hydraulic oil, can be conveyed through the hydraulic lines and provided to the hydraulic actuators 2a, 2b, 2c, 2d during operation of the hydraulic system 1.

The hydraulic system 1 comprises a first hydraulic circuit 4 with hydraulic lines and a first valve block 5 with switchable valve means (or valves) associated with the two hydraulic actuators 2a, 2b of the front axle of the motor vehicle 100. The hydraulic system 1 also comprises a second hydraulic circuit 6 with hydraulic lines and a second valve block 7 with switchable valve means associated with hydraulic actuators 2c, 2d of the rear axle of the motor vehicle 100. The active roll stabilization of the front axle and the rear axle of the motor vehicle 100 are advantageously separately controllable due to the two separate hydraulic circuits 4, 6 and the associated valve blocks 5, 7. The selective filling of hydraulic actuators 2a, 2b, 2c, 2d of the first actuator group with the hydraulic fluid is electronically controlled during operation of the hydraulic system 1.

In this embodiment, the active chassis of the motor vehicle 100 further comprises a hydraulic front axle lift device having a second group of actuators comprising two hydraulic actuators 8a, 8b. By way of the hydraulic front axle lift device, a front end of the motor vehicle 100 can be lifted as needed to in particular increase the slope angle. Each of the two hydraulic actuators 8a, 8b comprises a respective hydraulic lift cylinder that is integrated into one of the two struts of the front axle of the motor vehicle 100. The two actuators 8a, 8b of the hydraulic front axle lift device are connected to the electro-hydraulic motor pump unit 3 by means of a lift hydraulic conduit 9. The hydraulic roll stabilization device and the hydraulic front axle lift device therefore share the hydraulic system 1 of the active chassis so that it is advantageously not necessary to provide a separate hydraulic system for each of these two devices. The supply of the hydraulic fluid to the two hydraulic actuators 8a, 8b of the hydraulic front axle lift device to apply hydraulic fluid to their hydraulic cylinders via the hydraulic lift line 9 and thus to raise the front end of the motor vehicle 100 is also electronically controlled.

The hydraulic system 1 further comprises a switchable valve means, using which, switching can take place on the one hand between the roll stabilization function of the hydraulic roll stabilization device and the lift function of the hydraulic front axle lift device on the other hand, so that only one of the two functions of the active chassis is activated at the same time.

The hydraulic system 1 further comprises a hydraulic accumulator 10, which is preferably designed as a piston accumulator and which in this exemplary embodiment is connected to the second valve block 7 by means of a hydraulic line 11. The hydraulic accumulator 10 is designed to generate a bias within the hydraulic system 1, in particular a bias on a magnitude of about 10 bar. The hydraulic accumulator 10 is primarily used to supply the front axle lift actuators 8a, 8b to create volume balance.

The hydraulic system 1 explained hereinabove regarding operation of the active roll stabilizing device and the hydraulic front axle lift device is problematic with respect to thermal aspects. In particular, the electro-hydraulic motor pumping unit 3 and the second valve block 7, which is associated with the rear axle of the motor vehicle 100, are subjected to very high thermal stresses during operation of the hydraulic system 1. This problem is also exacerbated by the fact that no installation space is available for conventional cooling systems in order to, e.g., enable active cooling of the thermally loaded components of the hydraulic system 1.

To remedy this problem as outlined hereinabove, it is then proposed that the hydraulic system 1 comprises a cooling apparatus 12 having a cooling body 13, the cooling body 13 being attached to the hydraulic accumulator 10. As a result, it is advantageously possible to cool the hydraulic fluid within the hydraulic accumulator 10 so that improved cooling of thermally loaded components of the hydraulic system 1 can easily be achieved as well.

Figure 2:
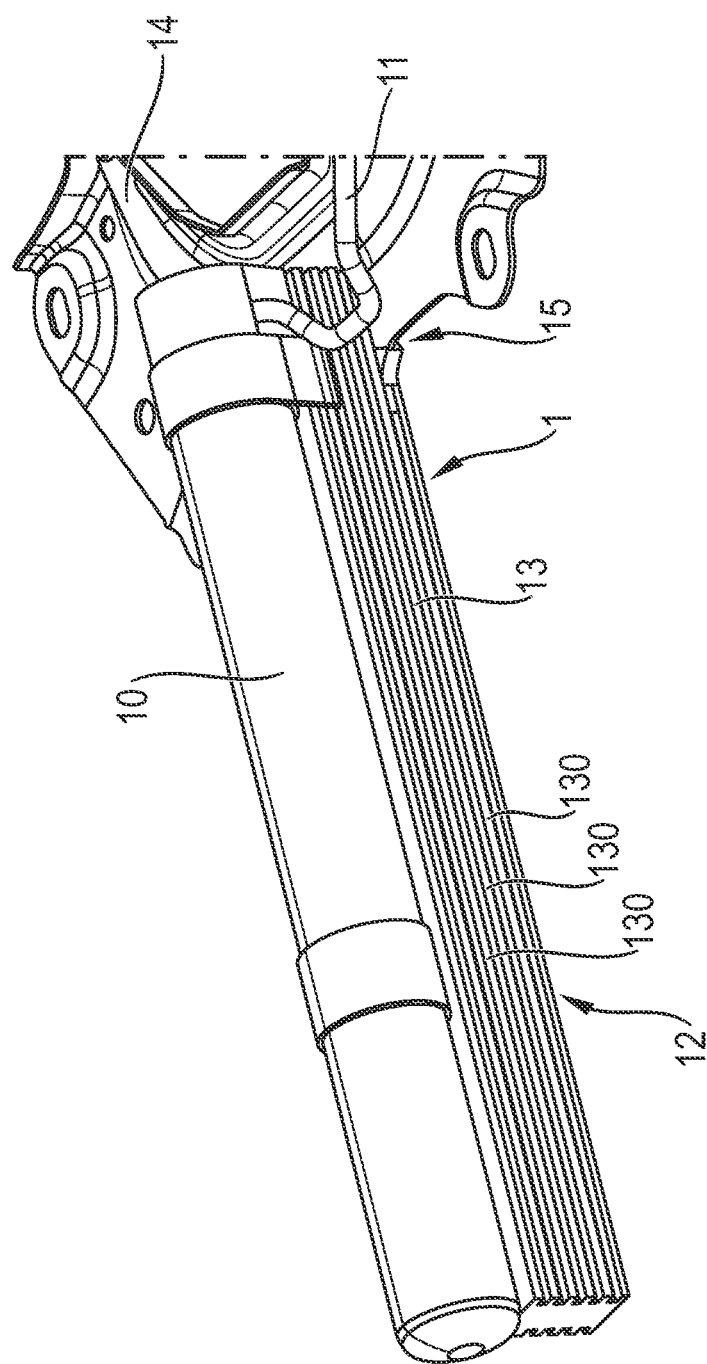
FIG. 2 is a detailed view of a hydraulic accumulator of a hydraulic system of the active chassis.

This hydraulic accumulator 10 with the cooling body 13 attached thereto is shown in detail in FIG. 2. In FIG. 1 this cooling body 13 is not shown. The outside of the cooling body 13 comprises a plurality of cooling fins 130, which cause the cooling surface of the cooling body 13 to be enlarged and improve heat dissipation as a result.

The cooling body 13 is preferably directly connected to the vehicle body 101 of the motor vehicle 100, in particular bolted thereto. This results in a further, significant increase of the cooling surface of the cooling body 13, so that a further improved heat dissipation can be achieved.

In this embodiment, the cooling apparatus 12 further comprises a cooler extension 14 that is attached to a connection portion 15 of the hydraulic accumulator 10 and that enables further improved heat dissipation. In one embodiment (not explicitly illustrated herein), there is the option of the cooler extension 14 being designed such that hydraulic fluid flows through and/or around it during operation. As a result, it is possible to make the cooling of the hydraulic fluid even more effective and efficient.

In order for cooling to be performed not only by diffusion (heat conduction), it can be provided that the cooling apparatus 12 is extended by additional means for cooling the hydraulic fluid. The means for cooling could be a cooler, radiator, chiller, finned body, and so forth. Faster cooling of the hydraulic fluid is achieved thereby.

What is claimed is:

1. A hydraulic system for an active chassis of a motor vehicle
having a plurality of hydraulic actuators, said hydraulic system comprising:
a plurality of hydraulic lines,
a hydraulic accumulator having an accumulator body that extends along a longitudinal axis,
an electro-hydraulic motor pump unit that is configured to convey a hydraulic fluid through the hydraulic lines during operation of the hydraulic system,
a plurality of valves associated with the hydraulic actuators, and
a cooling apparatus having:
(a) a cooling body that (i) extends along the longitudinal axis, (ii) includes a first side that is attached to a lower surface of the hydraulic accumulator such that the cooling body extends to an elevation beneath the accumulator body of the hydraulic accumulator, (iii) includes a second side that is opposite the first side, and (iv) includes heat exchange fins extending transversely from the longitudinal axis, and
(b) a cooler extension extending from the cooling body for connection to a body of the motor vehicle,
wherein the hydraulic system is configured to electronically control a selective filling of the hydraulic actuators with the hydraulic fluid.

2. The hydraulic system according to claim 1, wherein the cooling body is either screwed or directly connected to a vehicle body of the motor vehicle.

3. The hydraulic system according to claim 1, wherein the hydraulic accumulator comprises a connection portion to which the cooler extension of the cooling apparatus is attached.

4. The hydraulic system according to claim 3, wherein the cooler extension is configured such that hydraulic fluid flows through and/or around the cooler extension during operation of the hydraulic system.

5. The hydraulic system according to claim 1, wherein the cooling apparatus comprises further means for cooling the hydraulic fluid.

6. A motor vehicle comprising a vehicle body, an active chassis including a plurality of hydraulic actuators, and the hydraulic system according to claim 1.

7. The motor vehicle according to claim 6, wherein the hydraulic system and at least some of the hydraulic actuators of the plurality of hydraulic actuators constitute an active roll stabilization device of the motor vehicle.

8. The motor vehicle according to claim 6, wherein the hydraulic system and at least some of the hydraulic actuators of the plurality of hydraulic actuators constitute a front axle lift device of the motor vehicle.

9. The motor vehicle according to claim 6, wherein the hydraulic system and at least some of the hydraulic actuators of the plurality of hydraulic actuators constitute a level control device of the motor vehicle.

10. The motor vehicle according to claim 1, wherein the heat exchange fins are stacked between the accumulator body and the cooler extension.

11. The motor vehicle according to claim 1, wherein the accumulator body and the cooling body have cylindrical and rectangular shapes, respectively, as viewed in cross-section.

\* \* \* \* \*